(12) United States Patent
Halbritter et al.

(10) Patent No.: US 11,391,440 B2
(45) Date of Patent: Jul. 19, 2022

(54) LIGHT-EMITTING COMPONENT AND METHOD OF OPERATING A LIGHT-EMITTING COMPONENT

(71) Applicant: OSRAM OLED GmbH, Regensburg (DE)

(72) Inventors: Hubert Halbritter, Dietfurt (DE); Thomas Schwarz, Regensburg (DE)

(73) Assignee: OSRAM OLED GmbH, Regensburg (DE)

( * ) Notice: Subject to any disclaimer, the term of this patent is extended or adjusted under 35 U.S.C. 154(b) by 0 days.

(21) Appl. No.: 17/273,292

(22) PCT Filed: Sep. 11, 2019

(86) PCT No.: PCT/EP2019/074251
§ 371 (c)(1),
(2) Date: Mar. 3, 2021

(87) PCT Pub. No.: WO2020/053289
PCT Pub. Date: Mar. 19, 2020

(65) Prior Publication Data
US 2021/0341130 A1 Nov. 4, 2021

(30) Foreign Application Priority Data
Sep. 12, 2018 (DE) .......................... 102018122275.0

(51) Int. Cl.
*F21V 14/00* (2018.01)
*F21V 23/00* (2015.01)
(52) U.S. Cl.
CPC .......... *F21V 14/003* (2013.01); *F21V 23/003* (2013.01)

(58) Field of Classification Search
CPC .. F21V 14/003; F21V 23/003; G02F 2201/44; G02F 1/133603; G02F 1/13756; G09G 2320/0646
See application file for complete search history.

(56) References Cited

U.S. PATENT DOCUMENTS

| 2007/0223080 A1 | 9/2007 | Hagood, IV et al. |
| 2008/0297460 A1 | 12/2008 | Peng et al. |
(Continued)

FOREIGN PATENT DOCUMENTS

| DE | 102 33 719 A1 | 2/2004 |
| DE | 10 2007 010 039 A1 | 9/2008 |
| DE | 10 2013 108 811 A1 | 2/2015 |

OTHER PUBLICATIONS

International Search Report issued for International Patent Application No. PCT/EP2019/074251 dated Feb. 3, 2020, along with an English translation.

(Continued)

*Primary Examiner* — Peggy A Neils
(74) *Attorney, Agent, or Firm* — Hauptman Ham, LLP

(57) ABSTRACT

Light-emitting component includes a light source and a dimming element arranged downstream of the light source in a radiation direction. The dimming element includes a dimming layer. The light source includes at least one emitter which is configured to emit light. A brightness of a light emitted by the light-emitting component is adjustable. The brightness is partially adjustable by way of a pulse width modulated and/or amplitude modulated operating signal for the emitter, and the brightness is partially adjustable by way of partial absorption and/or reflection of the light emitted by the emitter in the dimming element. A dimming capability of the dimming layer increases along an extension direction transverse to the radiation direction. The dimming layer is displaceable along the extension direction relative to the (Continued)

light source. A degree of absorption and/or reflection of light emitted by the emitter is variably adjustable.

17 Claims, 8 Drawing Sheets

(56) References Cited

U.S. PATENT DOCUMENTS

| | | |
|---|---|---|
| 2008/0297880 A1 | 12/2008 | Steckl et al. |
| 2010/0079992 A1 | 4/2010 | De Beer et al. |
| 2012/0169953 A1 | 7/2012 | Kataoka et al. |
| 2014/0333991 A1 | 11/2014 | Satoh et al. |
| 2014/0335101 A1 | 11/2014 | Beimaert |
| 2015/0062907 A1* | 3/2015 | Ng ............................ F21V 9/38 362/293 |
| 2015/0131141 A1* | 5/2015 | Nakahara ............ G02F 1/13306 359/296 |
| 2015/0179139 A1 | 6/2015 | Watanabe et al. |
| 2018/0010773 A1* | 1/2018 | Mochizuki ............ F21V 14/003 |
| 2018/0235051 A1* | 8/2018 | Chen ....................... H05B 45/20 |
| 2019/0208159 A1* | 7/2019 | Hsieh ................... G02F 1/1334 |
| 2019/0310532 A1* | 10/2019 | Galstian .................. G02F 1/292 |

OTHER PUBLICATIONS

Written Opinion issued for International Patent Application No. PCT/EP2019/074251 dated Feb. 3, 2020.

* cited by examiner

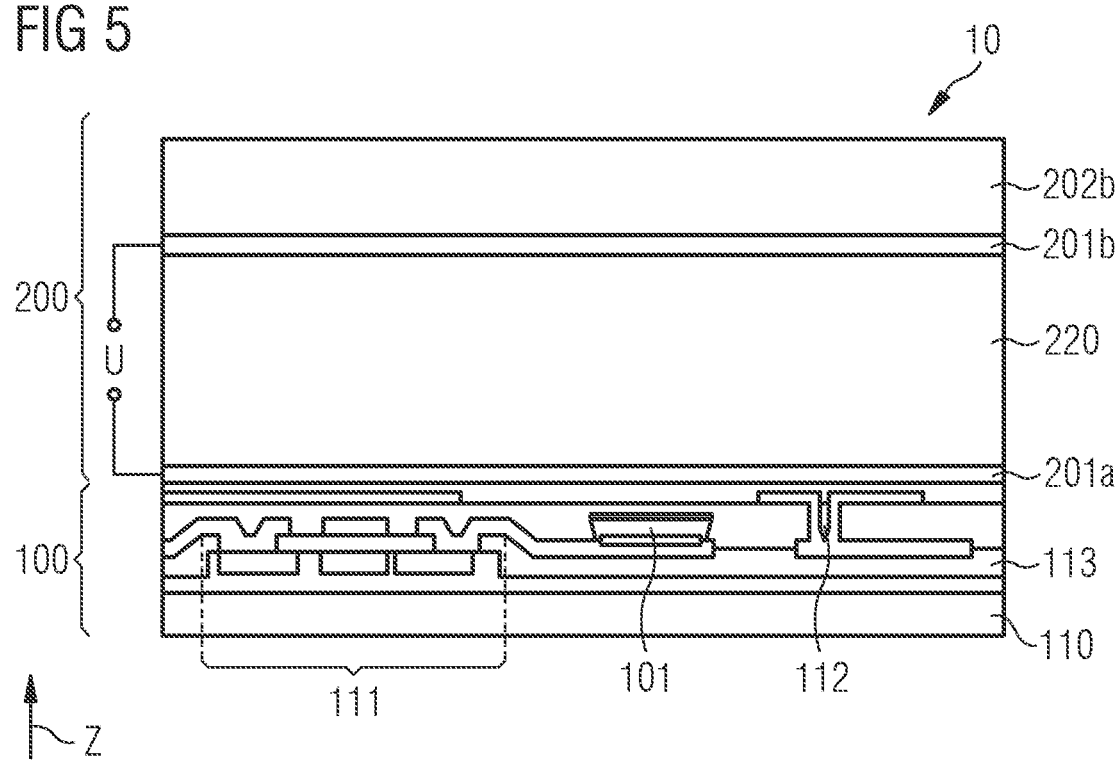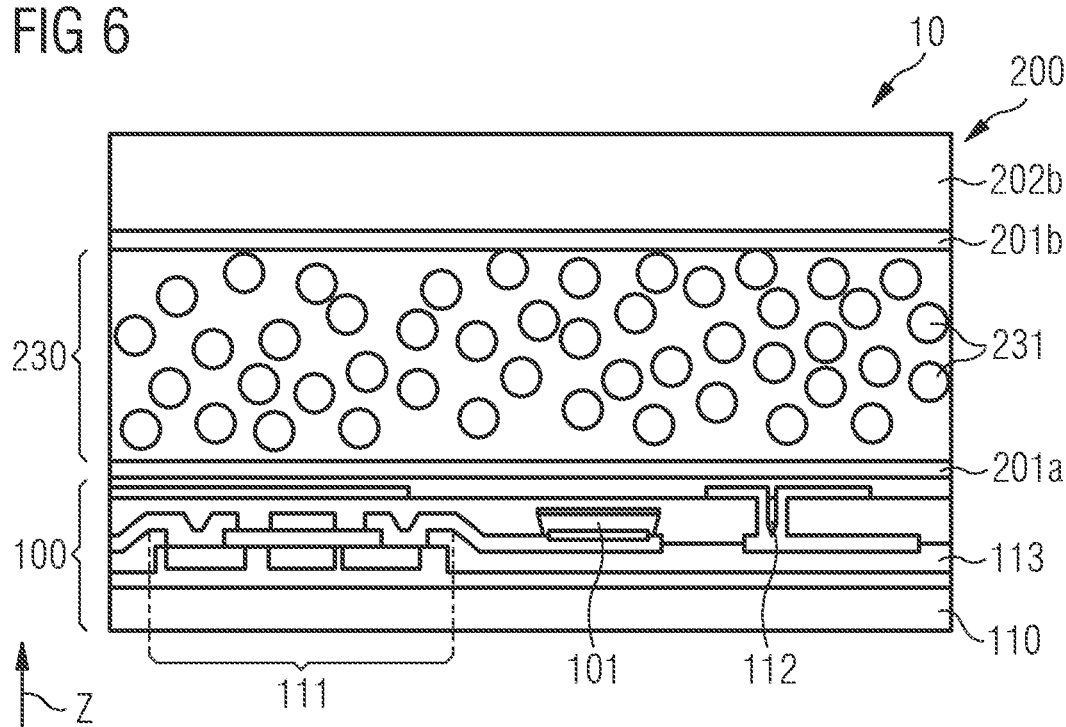

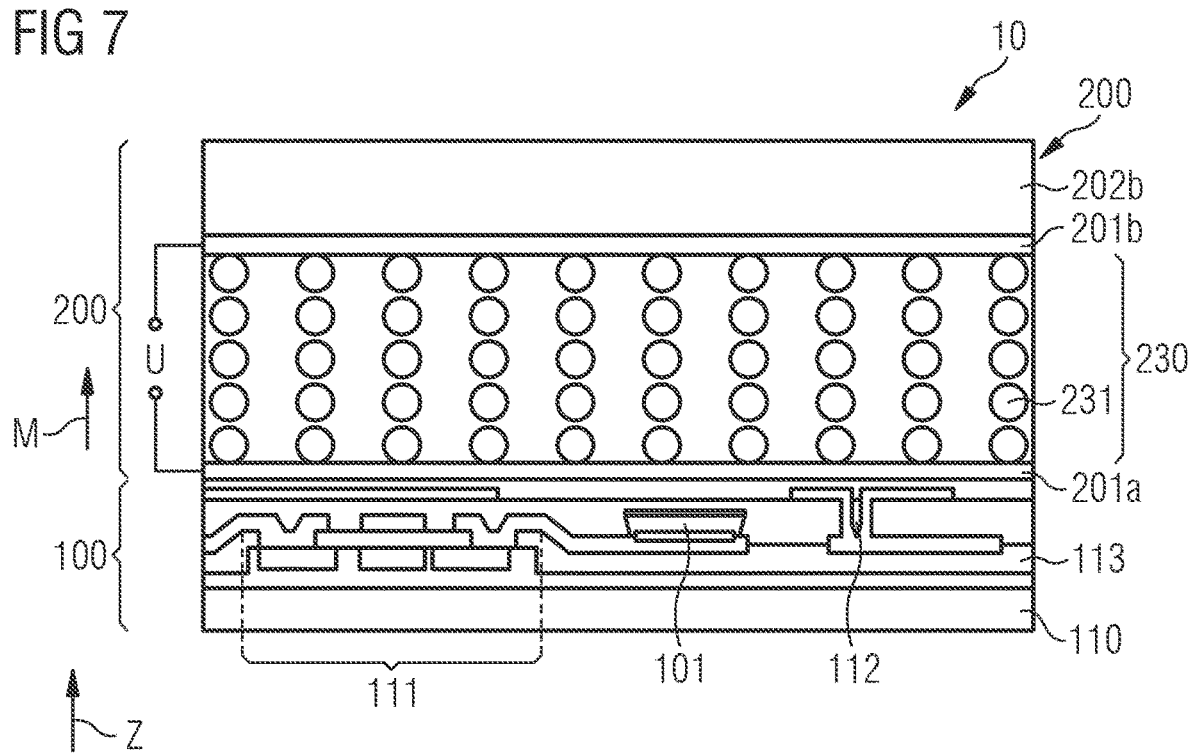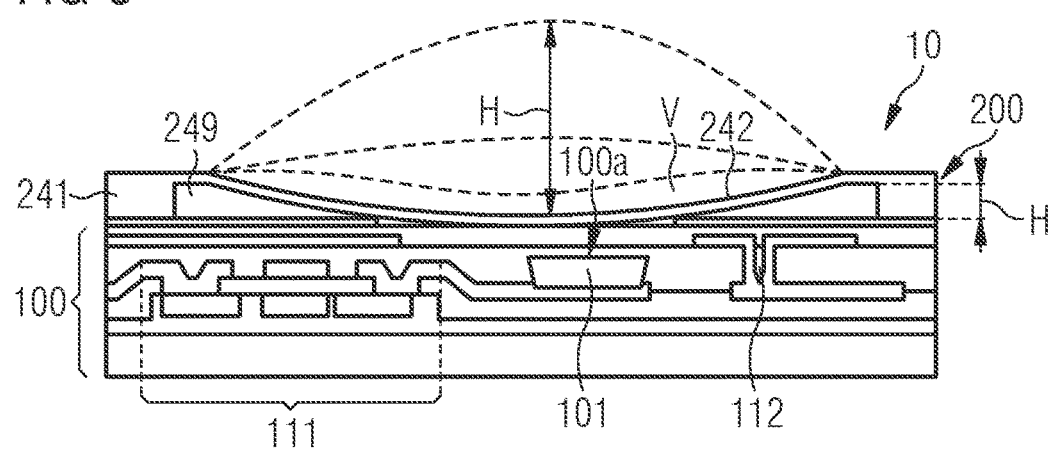

| 251 | T | P |
|---|---|---|
| 0 | 100.00% | 1:1 |
| 5 | 70.79% | 1:1.4 |
| 10 | 50.12% | 1:2.0 |
| 15 | 35.48% | 1:2.8 |
| 20 | 25.12% | 1:4.0 |
| 25 | 17.78% | 1:5.6 |
| 30 | 12.59% | 1:7.9 |
| 35 | 8.91% | 1:11 |
| 40 | 6.31% | 1:16 |
| 45 | 4.47% | 1:22 |
| 50 | 3.16% | 1:32 |
| 55 | 2.24% | 1:45 |
| 60 | 1.58% | 1:63 |
| 65 | 1.12% | 1:89 |
| 70 | 0.79% | 1:126 |
| 75 | 0.56% | 1:178 |
| 80 | 0.40% | 1:251 |
| 85 | 0.28% | 1:355 |
| 90 | 0.20% | 1:501 |
| 95 | 0.14% | 1:708 |
| 100 | 0.10% | 1:1000 |

(b)

| 251 | T | P |
|---|---|---|
| 0.00 | 100.00% | 1:1 |
| 0.50 | 70.79% | 1:1.4 |
| 1.00 | 50.12% | 1:2.0 |
| 1.50 | 35.48% | 1:2.8 |
| 2.00 | 25.12% | 1:4.0 |
| 2.50 | 17.78% | 1:5.6 |
| 3.00 | 12.59% | 1:7.9 |
| 3.50 | 8.91% | 1:11 |
| 4.00 | 6.31% | 1:16 |
| 4.50 | 4.47% | 1:22 |
| 5.00 | 3.16% | 1:32 |
| 5.50 | 2.24% | 1:45 |
| 6.00 | 1.58% | 1:63 |
| 6.50 | 1.12% | 1:89 |
| 7.00 | 0.79% | 1:126 |
| 7.50 | 0.56% | 1:178 |
| 8.00 | 0.40% | 1:251 |
| 8.50 | 0.28% | 1:355 |
| 9.00 | 0.20% | 1:501 |
| 9.50 | 0.14% | 1:708 |
| 10.00 | 0.10% | 1:1000 |

LIGHT-EMITTING COMPONENT AND METHOD OF OPERATING A LIGHT-EMITTING COMPONENT

CROSS REFERENCE TO RELATED APPLICATION

This application is a National Stage of International Application No. PCT/EP2019/074251, filed on Sep. 11, 2019, which designates the United States and was published in Europe, and which claims priority to German Patent Application No. 102018122275.0, filed on Sep. 12, 2018, in the German Patent Office. Both of the aforementioned applications are hereby incorporated by reference in their entireties.

A light-emitting component is specified. Furthermore, a method of operating a light-emitting component is specified.

One task to be solved is, inter alia, to specify a light-emitting component which comprises an improved radiation characteristic, in particular an improved dimmability. Another task to be solved is to specify a method for operating such a light-emitting component.

These tasks are solved in particular by the objects or methods according to the patent claims, the disclosure content of which is hereby incorporated by reference in the description.

A light-emitting component described herein comprises at least one light source and at least one dimming element arranged downstream of the light source in a radiation direction. The light source comprises at least one emitter configured to emit light. A brightness of a light emitted by the light-emitting component is adjustable. The brightness is adjusted, in a first part, by means of a pulse width modulated and/or amplitude modulated operating signal for the emitter and, in a second part, by means of partial absorption and/or reflection of the light emitted by the emitter in the dimming element.

The light-emitting component is configured to emit light with a predeterminable brightness. The brightness of the light-emitting component is adjustable partially by means of a pulse-width modulated operating signal for the emitter, in which an electrical voltage or current alternates between two values. Thereby, a duty cycle of a square-wave pulse is modulated at a constant frequency. By means of the duty cycle of the operating signal, a brightness of the light emitted from the emitter is adjustable. Each brightness step of the light emitted from the emitter corresponds to a fixed duty cycle of the pulse width modulated signal.

In addition, the brightness of the light emitted by the component is partially adjustable by means of partial absorption and/or reflection of the light emitted by the emitter in the dimming element. For example, the dimming element comprises a dimming capability that is adjustable. Here and in the following, "dimming capability" refers to the absorption and/or reflection capacity. By adjusting the dimming capability, it is possible to specify how large the proportion of light is which passes through the dimming element without being reflected and/or absorbed. For example, the dimming element comprises several discrete states in which the dimming capability of the dimming element is different. Thus, the brightness of the light emitted by the light-emitting component can be adjusted by means of the dimming element.

The light-emitting component is based, inter alia, on the idea that the brightness of the light emitted by the light-emitting component is adjustable partly by means of a pulse-width-modulated and/or amplitude-modulated operating signal for the emitter and partly by means of absorption and/or reflection of the light emitted by the emitter. This allows the brightness to be adjusted over a particularly wide dynamic range.

Advantageously, the combination of a pulse width modulated and/or amplitude modulated operating signal and a dimming element enables a particularly large dynamic range in which the brightness of the light emitted by the light-emitting component is adjustable. Furthermore, said combination simplifies a particularly small-step adjustment of this brightness.

According to one embodiment, the light source comprises at least one emitter of a first type, at least one emitter of a second type and at least one emitter of a third type, which are configured to emit light of different color locations, wherein a common dimming element is arranged downstream of the emitters in their radiation direction. For example, the emitter of the first type is configured to emit light of a red color location, the emitter of the second type is configured to emit light of a green color location, and the emitter of the third type is configured to emit light of a blue color location. The light emitted by the emitters of different types is mixed and emitted as mixed light from the light-emitting component. By separately driving the emitters of different types, the color location of the light emitted by the light-emitting component is thus adjustable.

The dimming element, which is arranged downstream of the emitters in common in the radiation direction, is formed, for example, continuously and simply connected. In particular, the dimming element comprises a substantially constant dimming capability transversely, in particular perpendicularly, to the radiation direction of the light-emitting component. In particular, the transparency of the dimming element for the light emitted by the emitters varies along a main surface of the dimming element by a maximum of 5% absolute, preferably by a maximum of 1% absolute.

According to one embodiment, the dimming element comprises a liquid crystal layer whose dimming capability is variably adjustable, in particular by applying different electrical voltages to the liquid crystal layer during operation of the component. The liquid crystal layer is configured to linearly polarize light passing through the liquid crystal layer in a predeterminable direction. By applying different electrical voltages, the direction in which light exiting the liquid crystal layer is polarized can be predetermined.

The liquid crystal layer can be followed by a polarization filter in the radiation direction. By means of the liquid crystal layer, it can be adjusted which portion of the light exiting the liquid crystal layer is reflected and/or absorbed in the polarization filter arranged downstream. Thus, by applying a voltage to the liquid crystal layer, the brightness of the light emitted by the light-emitting component can be adjusted.

According to another or further embodiment, the dimming element comprises an electrochromic layer whose dimming capability is adjustable by applying different electrical voltages to the electrochromic layer during operation of the component. For example, the electrochromic layer comprises transition metal oxides, in particular tungsten oxide, complex compounds, in particular Berliner Blau, or a conductive polymer. For example, by means of applying different electrical voltages, a redox reaction, in particular a reversible redox reaction, is caused in the electrochromic layer, thereby changing the transparency of the electrochromic layer for the radiation emitted by the emitter(s).

According to another or further embodiment, the dimming element comprises absorber and/or reflector particles in a suspension, wherein the dimming capability of the suspension is variably adjustable by applying an electric or magnetic field to the suspension during operation of the component.

For example, in a first state in which no electric or magnetic field is applied to the suspension, the absorber and/or reflector particles are randomly oriented within the suspension. Light passing through the suspension is likely to strike an absorber and/or reflector particle and to be absorbed or reflected. For example, in the first state, 90% of light passing through the dimming element is absorbed and/or reflected.

In a second state, in which an electric or magnetic field is applied to the suspension, the absorber and/or reflector particles are aligned relative to each other along the radiation direction. For example, the dimming element comprises two electrodes to which an electric voltage can be applied so that the suspension is arranged in an electric field between the electrodes. In particular, field lines of the electric or magnetic field run parallel to the radiation direction of the light-emitting component. In the second state, light passing through the suspension is less likely to strike an absorber and/or reflector particle than in the first state. Consequently, a smaller proportion of the light passing through the dimming element is absorbed and/or reflected in the second state. Thus, by applying an electric or magnetic field to the suspension, the dimming capability of the suspension is adjustable.

According to another or further embodiment, the dimming element comprises at least one liquid chamber, whose volume is variable. The liquid chamber is filled with a reflective and/or absorbent liquid, and the dimming capability of the dimming element is variably adjustable by changing the volume of the liquid chamber during operation of the component. By increasing the volume of the liquid chamber, a path length that light travels within the reflective and/or absorbent liquid is increased. An increased path length of light within the reflecting and/or absorbing liquid increases the probability of reflection and/or absorption of light within the liquid. The larger the volume of the liquid chamber the lower the transparency of the dimming element.

For example, the light-emitting component comprises a pump by means of which the reflective or absorbent liquid is removed from or supplied to the liquid chamber.

According to another or further embodiment, the dimming element comprises a dimming layer whose dimming capability increases along one of its extension directions transverse to the radiation direction. The dimming layer comprises a light absorbing and/or reflecting material. For example, the dimming layer is arranged on a carrier layer, wherein the carrier layer is a mechanically supporting component of the dimming element. In particular, the dimming layer is formed in a multiple connected or non-contiguous manner. "Multiple connected" here and in the following describes a topology in which subregions of, for example, a layer are interconnected at multiple locations. In other words, a multiple connected layer comprises cutouts which are completely surrounded by the layer in at least one plan view. The dimming layer comprises, for example, a metal, in particular chromium, for reflecting and/or absorbing light.

For example, the dimming capability of the dimming layer increases along the extension direction due to an increasing thickness of the dimming layer along the extension direction. In this case, the thickness of the dimming layer is measured parallel to the radiation direction of the light-emitting component.

In an alternative embodiment, the dimming layer comprises cutouts that completely penetrate the dimming layer in the radiation direction. The dimming capability of the dimming layer increases as a area proportion of the cutouts in the dimming layer decreases along the extension direction.

In order to increase the dimming capability of the dimming layer in an extension direction transverse to the radiation direction, for example, the area proportion of the cutouts is reduced along this extension direction. For example, the size of the cutouts is reduced along the extension direction while the resolution remains the same. Alternatively, the number of cutouts per unit area decreases along the extension direction.

For example, the cutouts along a main surface of the dimming layer comprise an average diameter in the submicrometer range. In particular, the cutouts are lithographically produced in the dimming layer.

In the last two embodiments described, the dimming layer is displaceable along the extension direction relative to the light source, and a degree of absorption and/or reflection of light emitted from the emitter is variable by means of displacing the dimming layer relative to the light source during operation of the component. For example, by displacing the dimming layer along the extension direction relative to the light source, the thickness of the dimming layer through which the light emitted from the emitter passes is changed. Thus, a portion of the light emitted by the emitter is absorbed and/or reflected is varied. Alternatively, by moving the dimming layer, the area fraction of the cutouts is changed, which is arranged downstream of the light source in the radiation direction X, so that a varied fraction of the light emitted by the light source is absorbed and/or reflected.

According to another or further embodiment, the light-emitting component comprises at least two emitters of the same type, which are configured to emit light of a substantially same color location. In this case, the dimming element comprises at least two segments, wherein each of the at least two emitters is associated with one of the segments, and the segments comprise mutually different dimming capabilities for the light emitted by the emitters. The segments are thus configured to reflect and/or absorb a different proportion of the light emitted by each emitter of the same type. Thus, by operating different emitters of the same type, it is possible to change the brightness of the light source while maintaining the same color location.

For example, the at least two segments are formed with a reflecting and/or absorbing material in different layer thickness. Alternatively, the at least two segments each comprise, for example, an aperture having diameters different from each other such that a different portion of light generated in the emitter is emitted through the aperture. Alternatively, the at least two segments are formed with different materials that differ in their transparency to light emitted by the emitters.

For example, a light-emitting component according to the last described embodiment comprises at least two emitters of a first type, at least two emitters of a second type, and at least two emitters of a third type, and a dimming element comprising at least six segments, wherein each of the emitters is assigned to one of the segments. In this way, a pixel can be displayed in two different brightness levels solely by means of the segments. In principle, even more brightness levels can also be displayed according to this principle.

According to one embodiment, the light-emitting component is an image display device, wherein the light-emitting component comprises a plurality of light sources arranged side by side, and the color location of the light emitted by each light source is individually adjustable in each case. For example, the image display device is a screen for displaying two-dimensional image information. In particular, each light source is capable of displaying one pixel of the image display device. In particular, one pixel of the image display device is displayable with each light source.

Advantageously, the image display device is particularly well suited for use in an environment with strongly changing ambient light, since the brightness of the image display device is particularly adaptable due to the large dynamic range.

According to one embodiment, a common dimming element is arranged downstream of the light sources of, for example, the image display device. The dimming element reflects and/or absorbs substantially an equal portion of the light emitted by all light sources. In particular, the dimming element comprises a homogeneous transparency for the light emitted by the light sources. Here and hereinafter, homogeneous is understood to mean that the transparency is homogeneous to the extent that any measurable inhomogeneities are not perceived by the human eye. For example, the transparency of the dimming element is independent of the wavelength of the light to be absorbed and/or reflected.

According to one embodiment of an image display element, the image display element comprises a dimming element comprising a liquid chamber as previously described. The liquid chamber comprises a plurality of sections, wherein each light source is assigned to one of the sections, and the sections are interconnected with channels, and the channels and the sections form a contiguous volume. Advantageously, subdividing the liquid chamber into a plurality of sections allows the volume of the liquid chamber to be adjusted particularly precisely so that the dimming capability of the dimming element varies to a particularly small extent for all light sources.

According to one embodiment, the light-emitting component, which is for example the image display element, is formed with a dimming element comprising a dimming layer. The dimming capability of the dimming layer varies periodically along the extension direction of the dimming layer with a periodicity corresponding to the distances between the light sources. For example, each light source is assigned a region of the dimming layer in which the dimming capability of the dimming layer comprises a local minimum and a local maximum. In particular, by displacing the dimming layer relative to the light sources, their absorption and/or reflection capability is changed to the same extent for all emitters. In particular, the light sources and the dimming layer are aligned relative to each other such that in each displacement position along the extension direction, the light emitted by each light source is absorbed and/or reflected in the dimming layer to an equal extent.

A method of operating a light-emitting component is further specified. In particular, the method can be used to operate a light-emitting component described herein. That is, all features disclosed for the light-emitting component are also disclosed for the method, and vice versa.

According to one embodiment of the method, the light source is operated at a repetition rate of at least 60 Hz. In particular, the light source is operated at a repetition rate of at least 100 Hz. For example, the light-emitting component is an image display element configured to display images at a repetition rate of at least 60 Hz, preferably at least 100 Hz.

The light emitted by the light-emitting component comprises a color depth of at least 18 bits, wherein at least 6 bits of the color depth are adjusted by means of the dimming element arranged downstream of the light source in the radiation direction, and a remaining portion of the color depth is adjusted by means of a pulse width modulated and/or amplitude modulated operating signal of the emitters. In particular, a maximum of 12 bits of the color depth are adjusted by means of the pulse width modulated and/or amplitude modulated operating signal of the emitters.

The color depth of the emitted light describes how precisely discrete brightness values of the light emitted by the light-emitting component can be adjusted. The color depth is specified in bits and describes in binary number space the number of possible discrete states and thus the number of possible discrete brightness gradations within a dynamic range.

The dynamic range comprises the range within which the brightness of the light emitted by the light-emitting component can be adjusted. The dynamic range is specified by the ratio of the maximum brightness to the minimum brightness. In this case, the gradations are linear gradations between a maximum and a minimum brightness value of the light emitted by means of the light-emitting component.

For example, the light-emitting component comprises a dynamic range of 1:5000. In other words, the maximum brightness of the emitted light is 5000 times greater than the minimum brightness. For example, the color depth is at least 18 bits, so that $2^{18}$ brightness gradations of the light emitted by the light-emitting component can be set between the maximum brightness and the minimum brightness.

In particular, the light emitted by the light-emitting component comprises a color depth of at least 20 bits, preferably at least 22 bits. In particular, at least 8 bits, preferably at least 10 bits, of the color depth are adjustable by means of absorption and/or reflection of the light emitted by the emitter at the dimming element. Preferably, at least 12 bits of the color depth are adjustable by means of the pulse width modulated and/or amplitude modulated operating signal of the emitter.

Further advantages and advantageous embodiments and further embodiments of the light-emitting semiconductor component, the method for operating a light-emitting semiconductor component and the display device result from the following exemplary embodiments shown in connection with the figures.

In the Figures:

FIGS. 1, 3, 4, 5, 6, 7, 8, 12, 13, 14, 15, 16, 17, 18 and 19 show schematic sectional views of exemplary embodiments of a light-emitting component;

In the exemplary embodiments and figures, similar or similarly acting constituent parts are provided with the same reference symbols. The elements illustrated in the figures and their size relationships among one another should not be regarded as true to scale. Rather, individual elements may be represented with an exaggerated size for the sake of better representability and/or for the sake of better understanding.

Figure 1:
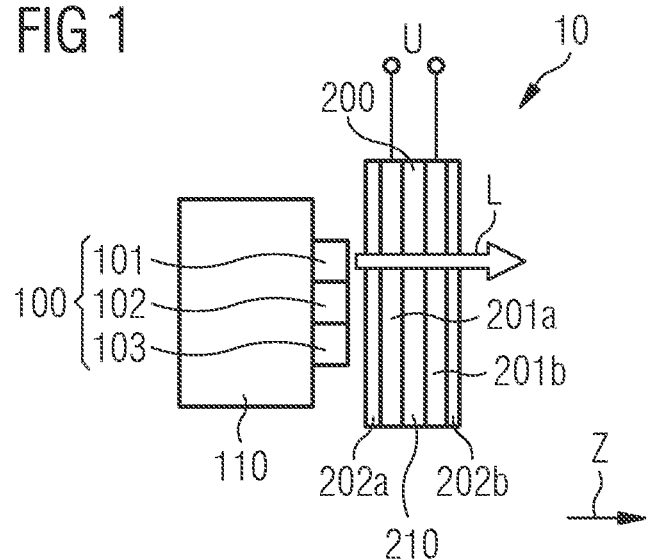

FIG. 1 shows a schematic sectional view of a light-emitting component 10 according to one embodiment. The light-emitting component 10 comprises a light source 100, which is arranged on a carrier 110. The light source 100 comprises an emitter of a first type 101, an emitter of a second type 102 and an emitter of a third type 103. The emitters 101, 102, 103 are configured to emit light of different color locations. By means of separate control of the emitters, the color location of light L1 emitted by the light source in total is adjustable.

A dimming element 200 is arranged downstream of the light source 100 in a radiation direction Z and is configured to absorb and/or reflect part of the light L1 emitted by the light source 100. The absorption and/or reflection takes place in particular independently of the color location of the light L1.

The dimming element 200 comprises a liquid crystal layer 210 whose dimming capability is variably adjustable by applying different electrical voltages U during operation of the component 10. The liquid crystal layer 210 is arranged between a first 201a and a second 201b electrode, by means of which an electrical voltage U can be applied to the liquid crystal layer 210. The electrodes 201a, 201b are respectively arranged main surfaces of a first 202a and a second 202b cover layer, wherein the main surfaces face each other. In particular, the liquid crystal layer 210 comprises a liquid crystal material such as that used in conventional LCD displays.

The cover layers 202a, 202b are mechanically self-supporting components of the dimming element 200 and each form opposing main surfaces of the dimming element 200. The first cover layer 202a is arranged upstream of the liquid crystal layer 2010 in the radiation direction Z, and the second cover layer 202b is arranged downstream of the liquid crystal layer 210 in the radiation direction Z. In particular, both the electrodes 201a, 201b and the cover layers 202a, 202b are substantially transparent to the light L emitted from the light source 100.

The brightness of the light L2 emitted by the light-emitting component 10 is adjustable partially a pulse width modulated and/or amplitude modulated operating signal for the emitters 101, 102, 103 and partially by the dimming element 200. In particular, the brightness of the light L2 emitted by the light-emitting component 10 is adjustable by varying the operating current of the emitter 101. For example, the operating current of the emitter 101 is adjustable by pulse width modulation and/or amplitude modulation of its operating signal.

Figure 2:
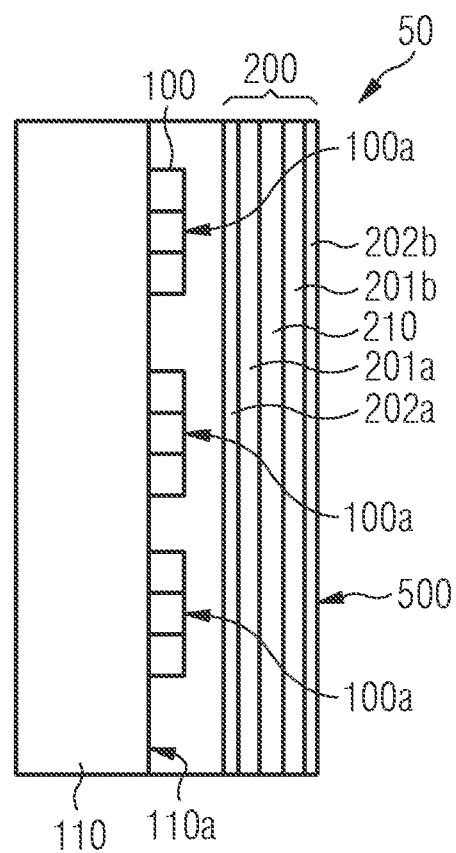

FIG. 2 shows another exemplary embodiment of a light-emitting component 10 in a schematic sectional view. The light-emitting component 10 in FIG. 2 is an image display device 50, comprising a plurality of light sources 100. The light sources 100 are arranged side by side on a main surface 110a on a carrier 110.

In particular, the features disclosed in connection with the image display device 50 are also disclosed for light-emitting components 10 and vice versa.

Each of the light sources 100 comprises an emitter of a first type 101, an emitter of a second type 102, and an emitter of a third type 103. These emitters 101, 102, 103 are independently controllable. In operation of the component 10, the respective color location of light L2 emitted by each light source 100 is individually adjustable. In particular, the emitter of the first type 101 emits light in the red wavelength range, the emitter of the second type 102 emits light in the green wavelength range, and the emitter of the third type 103 emits light in the blue wavelength range. By means of the light sources 100, a pixel 500 of the image display device 50 can be displayed in each case.

The light sources 100 each comprise an emission surface 100a transverse to the radiation direction Z, through which at least a majority of light emitted by each emitter 101, 102, 103 exits the light source 100 during operation. For example, a pixel 500 comprises a size of 1 mm² transverse to the radiation direction Z and the emission surface 100a comprises a size of at least 100 µm² inclusive and at most 2500 µm² inclusive. Alternatively, a pixel 500 comprises a size of 10000 µm² and the emitters of the light source 100 comprise a size between 1 µm² and 25 µm² inclusive.

Downstream of the light sources 100 a common dimming element 200 is arranged. The dimming element 200 reflects and/or absorbs from all light sources 100, in particular from all emitters 101, 102, 103 of the light sources 100 substantially an equal proportion of the respective emitted light.

The light sources 100 are operated, for example, at a repetition rate of at least 60 Hz, preferably at least 100 Hz.

The light L2 emitted by the light-emitting component 10 comprises a color depth of at least 18 bits. At least 1 bit, preferably at least 6 bits, of the color depth are adjusted by means of absorption and/or reflection of the light L2 emitted by the light source 100 in the dimming element 200. The remaining portion of the color depth, for example 12 bits, is adjusted by the pulse width modulated and/or amplitude modulated operating signal of the emitters 101, 102, 103.

Figure 3:
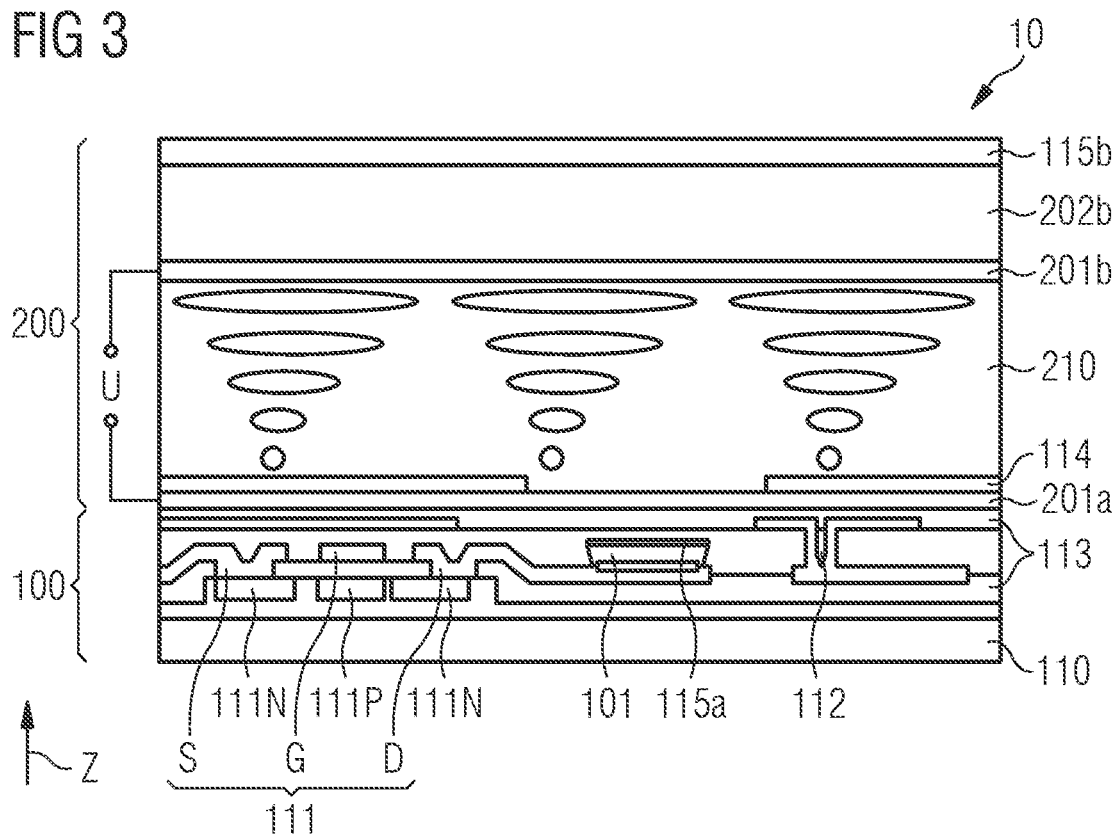

FIG. 3 shows an exemplary embodiment of a light-emitting component 10 in a schematic sectional view. The light source 100 comprises a TFT substrate in which an emitter 101 is integrated. The TFT substrate comprises, for example, polysilicon and insulation layers 113 formed with silicon oxide.

A transistor 111 is formed in the light source 100, by means of which the emitter 101 can be controlled. The transistor 111 comprises a source electrode S, a gate electrode G and a drain electrode D. By applying a voltage to the gate electrode G, the electrical conductivity of a p-type region 111P is adjustable so that a current flowing between n-type regions 111N is controllable.

A first polarization filter 115a, which is transparent only to linearly polarized light, is disposed downstream of the emitter 101 in the radiation direction. The first polarization filter 115a is arranged directly on the emitter 101 and comprises, for example, a dielectric layer stack, silicon oxide or titanium oxide.

A filtering effect of the first polarization filter 115a depends, for example, on an angle of incidence of the light L1. In particular, a surface of the emitter 101 on which the first polarization filter 115a is arranged is smooth. Alternatively, the first polarization filter 115a is formed in the emitter 101 or on a side of the emitter 101 opposite to the liquid crystal layer 210.

The arranging of the first polarization filter 115a is performed, for example, during the fabrication of the emitter 101. In particular, the first polarization filter 115a is formed as a photonic crystal.

In the case that the light-emitting component 10 comprises emitters of different types 101, 102, 103 which emit light of different color locations, mutually different first polarization filters 115a may be arranged, for example directly, on the emitters 101, 102, 103.

The dimming element 200 is arranged, for example directly, on the light source 100. In particular, the dimming element 200 may be manufactured on the light source 100. The dimming element 200 comprises a first electrode 201a on a side facing the light-emitting component 100. The liquid crystal layer 210 and a second electrode 201b are arranged on the first electrode 201a in the radiation direction Z. The first and second electrodes 201a, 201b comprise, for example, a transparent conductive oxide, in particular indium tin oxide (ITO).

The second electrode 201b is arranged on the second cover layer 202b, which is a mechanically supporting component of the dimming element 200. A second polarization filter 115b, comprising for example a polyvenyl alcohol, is arranged on a side of the second cover layer 202b facing away from the liquid crystal layer 210. The second polarization filter 115b is transparent, for example, only to linearly polarized light. In particular, the first polarization filter 115a and the second polarization filter 115b comprise different reflectivities for different polarization directions. By means of the different reflectivities, it is ensured that only light L2, which is changed in its polarization direction in the liquid crystal layer in the intended manner, passes through both polarization filters, and thus the dimming element.

An anti-reflection layer 114 is arranged on the first electrode 201a. In a region where the light emitted from the emitter 101 exits the light source 100, the anti-reflection layer 114 comprises an opening. Advantageously, ambient light incident from outside is absorbed by the anti-reflection layer 114. Thus, the light-emitting component 10 appears to be particularly dark when switched off, since a particularly small proportion of the ambient light is reflected by the light-emitting component 10.

During intended operation, light is generated in the emitter 101 which is, for example, unpolarized. The light is filtered by the first polarization filter 115a applied to the emitter 101 in such a way that only linearly polarized light is incident on the liquid crystal layer 210. In particular, the first 115a and the second 115b polarization filters are arranged such that only light L whose polarization is rotated by 90° in the liquid crystal layer passes through the first 115a and the second 115b polarization filters. By applying different voltages U to the liquid crystal layer 210, the polarization direction of the light passing through the liquid crystal layer 210 can be variably adjusted. Thus, by means of the voltage U, it is possible to adjust the proportion of the light L1, which passes through the liquid crystal layer 210, passes through the second polarization filter 115b and is emitted by the light-emitting component 10.

Alternatively to the integration of the emitter 101 in a TFT substrate, the emitter may be arranged on another carrier 110 and be controllable by an IC chip. Advantageously, the emitter 101 can be controlled by the IC chip with particularly short switching times, for example 10 ns.

Figure 4:
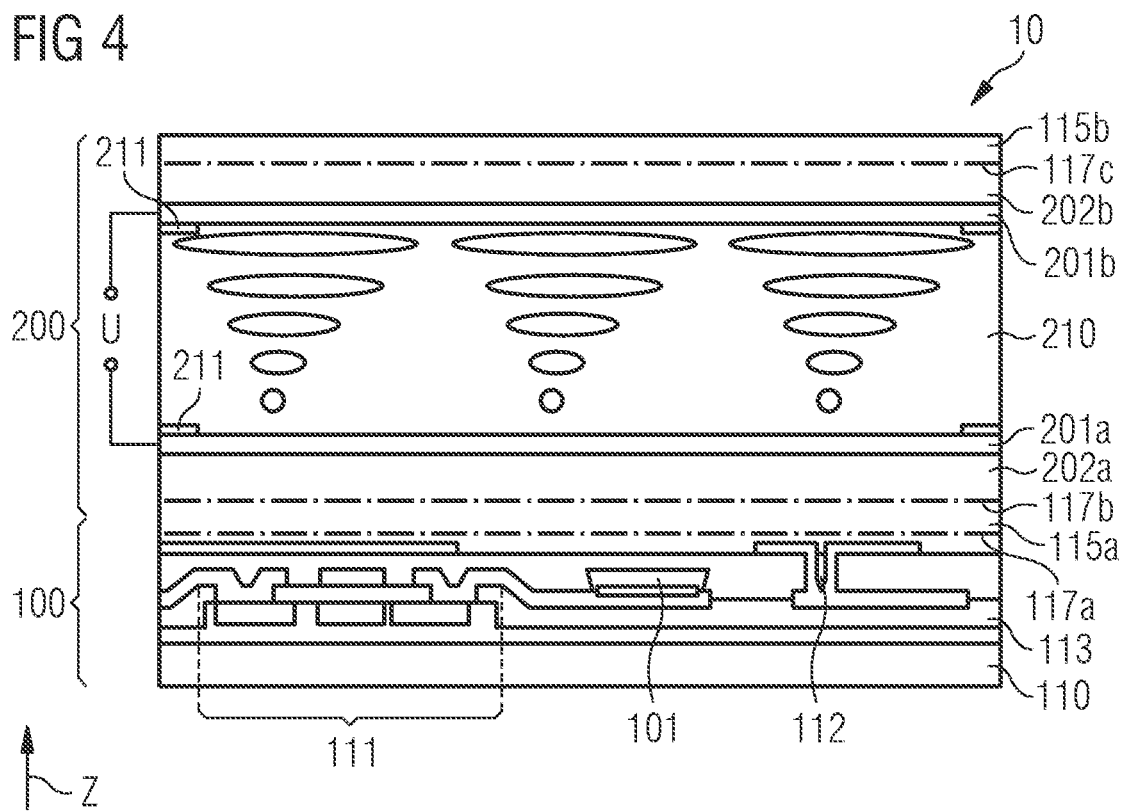

FIG. 4 shows an exemplary embodiment of a light-emitting component 10 in a schematic sectional view. The light source 100 shown in FIG. 4 differs from the light source 100 shown in FIG. 3 in that no polarization filter is arranged on the emitter 101.

The dimming element 200 is formed with two cover layers 202a, 202b and two polarization filters 115a, 115b. In particular, the light source 100 and the dimming element 200 are formed separately from each other. The dimming element 200 and the light source 100 are cohesively connected to each other. A first adhesive layer 117a is used to attach the first polarization filter 115a to the light source 100. On a side of the first polarization filter 115a facing away from the light source 100, the first cover layer 202a is attached by means of a second adhesive layer 117b. Arranged on the first cover layer 202a are the first electrode 201a, the liquid crystal layer 210, the second electrode 201b, the second cover layer 202b, the third adhesive layer 117c, and the second polarization filter 115b.

A metal grid 211 is arranged on each sides of the first electrode 201a and the second electrode 201b facing the liquid crystal layer 210. The metal grid 211 is configured to enhance a distribution of charge carriers across the first 201a electrode and the second 201b electrode, thereby enhancing electrical contacting of the liquid crystal layer 210.

For example, the first polarization filter 115a and the second polarization filter 115b are both formed with an organic material and are respectively arranged over the entire surface of the first cover layer 202a and the second cover layer 202b.

FIG. 5 shows a schematic sectional view of an exemplary embodiment of a light-emitting component 10 described herein. The light-emitting component 10 includes an electrochromic layer 220 in the dimming element 200. The dimming capability of the dimming element 200 is variably adjustable by applying different voltages U to the electrochromic layer 220 via the first 201a and second 201b electrodes. By means of varying the voltage U, a variation in the transparency of the electrochromic layer is caused. For example, the voltage U is at most 3 volts.

The dimming element 200 is fabricated on the light source 100, for example. The dimming element 200 and the light source 100 are cohesively connected to each other. The electrochromic layer 220 is formed with, for example, tungsten trioxide or polyaniline.

FIGS. 6 and 7 show an exemplary embodiment of a light-emitting component, each in a schematic sectional view. The light-emitting component 10 comprises the light source 100 and the dimming element 200.

The dimming element 200 comprises a suspension 230 with absorber and/or reflector particles 231. Along the radiation direction Z, a first electrode 201a is arranged upstream of the suspension 230 and a second electrode 201b is arranged downstream.

FIG. 6 shows the dimming element 200 in a first state, in which no voltage U is applied to the first electrode 201a and to the second electrode 201b. In the first state, the absorber and/or reflector particles 231 are randomly oriented within the suspension 230 such that the dimming element 200 is substantially opaque to light L1 emitted from the light source 100.

FIG. 7 shows the dimming element 200, which is also shown in FIG. 6, in a second state in which an electric field is applied to the suspension 230. The field lines of the electric field M run parallel to the radiation direction Z. The electric field M is generated by applying a voltage U to the first electrode 201a and the second electrode 201b. In the suspension 230, the absorber and/or reflector particles 231 align along the field lines of the electric field M. Thus, the probability for the light L2 emitted from the light source 100 to strike the absorber and/or reflector particles within the suspension is reduced. For example, in the second state, at least 65% of the light L2 emitted from the light source 100 is transmitted through the suspension 230.

In the second state, the dimming element 200 comprises a reduced dimming capability compared to the first state. Advantageously, the brightness of the light L1 emitted by the light-emitting component 10 can thus be adjusted by applying different voltages U to the electrodes 201a, 201b of the dimming element 200.

FIG. 8 shows an exemplary embodiment of a light-emitting component 10 in a schematic sectional view. In this exemplary embodiment, the light-emitting component 10 comprises a dimming element having a liquid chamber 240, which comprises a volume V that is variable. It is partially bounded by a flexible membrane 242, the possible deflection of which is shown schematically with dashed lines. The flexible membrane 242 partially rests on a spacer 249, which along the radiation direction Z comprises, for example, a height H between 5 µm and 100 µm inclusive. The spacer 249 is arranged on an anti-reflection layer 114.

The liquid chamber 240 is fillable with a reflective and/or absorbent liquid 241. The dimming capability of the dimming element 200 is variably adjustable by changing the volume V of the liquid chamber 240 during operation of the component 10. By filling the liquid chamber 240, the travel distance of the light L2 within the reflective and/or absorbent liquid 241 is increased, thereby increasing the probability of absorption and/or reflection of the light L2 within the reflective and/or absorbent liquid 241.

For example, the reflective and/or absorbent liquid 241 may comprise colorants such as titanium oxide, ceramic color particles, organic color particles, or carbon black. For example, a height H of the liquid chamber 240 above the light source is adjustable in a range between 1 μm and 100 μm by varying the volume V of the liquid chamber 240.

For example, the emission surface 100a of the light source 100 is at most 5 μm×5 μm, preferably at most 1 μm×1 μm. Advantageously, the smaller the emission surface 100a, the smaller the variation in the travel distance of light L1 through the reflecting and/or absorbing liquid due to a curvature of the flexible membrane 242.

Figure 9:
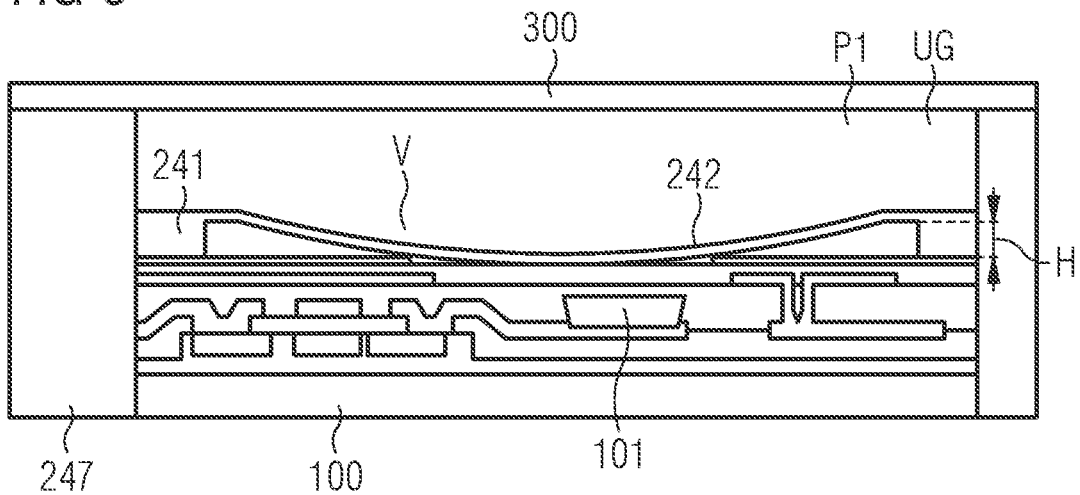
FIGS. 9, 10 show schematic top views of exemplary embodiments of light-emitting components.

FIG. 9 shows an exemplary embodiment of a light-emitting component 10 in a schematic sectional view. In this exemplary embodiment, the pump 247 is configured to vary a pressure P1 in a predetermined ambient volume UG. A cover glass 300 is arranged above the flexible membrane 242, which partially limits the ambient volume UG above the flexible membrane 242. By means of the pump 247, a fluid, in particular gas, for example air, is supplied or discharged, whereby the pressure P1 in the ambient volume UG is changed. The pressure change in the ambient volume UG is compensated by means of a deflection of the flexible membrane 242, whereby the volume V of the reflecting and/or absorbing liquid 241 above the light source 100 is changed.

Figure 10:
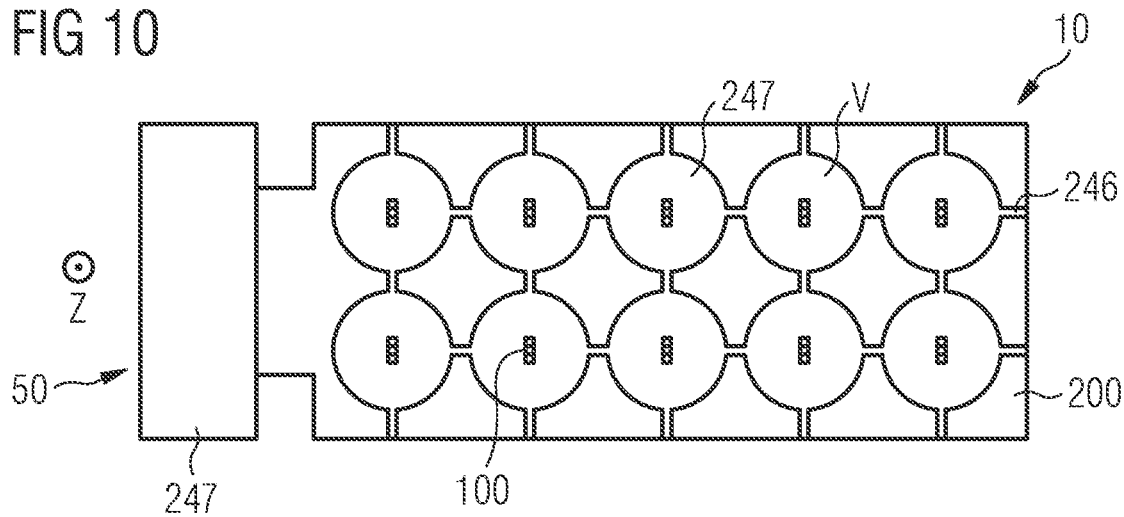
Figure 11:
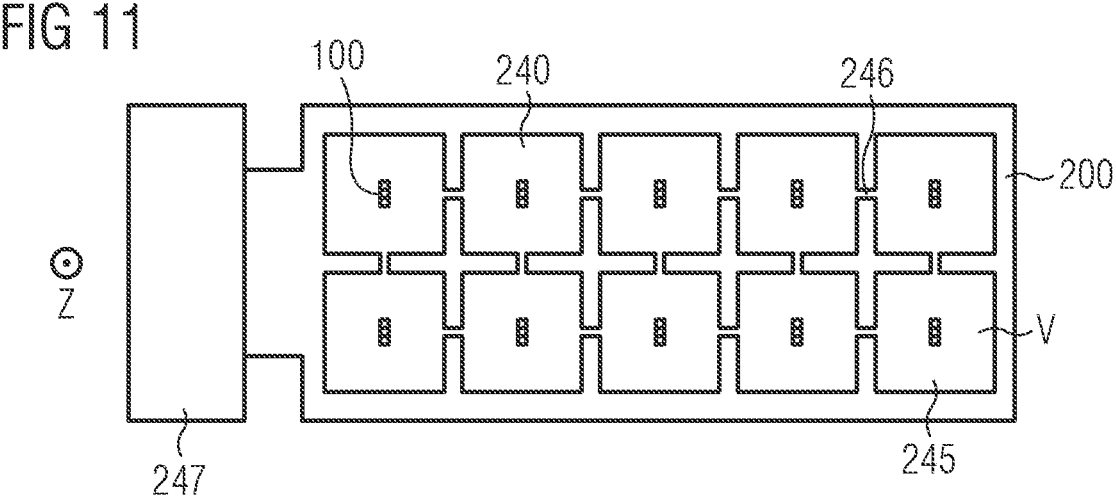
FIG. 11 shows a table showing transparency and attenuation as a function of the thickness of the dimming layer of a light-emitting component according to an embodiment.

FIGS. 10 and 11 show schematic top views of exemplary embodiments of light-emitting components 10 along the radiation direction Z. Each light-emitting components 10 comprises a dimming element 200 with a liquid chamber 240 divided into a plurality of sections 245. In particular, the light-emitting component 10 comprises a plurality of light sources 100, wherein each light source has a section 245 of the liquid chamber 240 downstream thereof. The individual sections of the liquid chamber 240 are interconnected by channels 246 and form a connected volume. The sections 245 are each bounded on their side facing away from the light sources 100 by the flexible membrane 242. In plan view, the sections 245 comprise a circular contour in the exemplary embodiment shown in FIG. 10. In the exemplary embodiment shown in FIG. 11, the sections 245 comprise a square contour in plan view.

By means of the pump 247, the reflective and/or absorbent liquid 241 is pumped into or out of the liquid chamber 240

FIG. 12 shows a tabular overview of the transmission T in percent and the relative attenuation P as a function of a thickness 251 of a dimming layer 250 in μm. The basis for these numerical values is the absorption law, which reads as follows: $N(x)=N(0) \, e^{-\mu x}$. Where x is the thickness of the dimming layer, N(0) is the intensity of light L1 before entering the dimming layer, N(x) is the intensity of light L2 as it exits the dimming layer, and μ is the absorption coefficient.

In table (a), the transmission T and relative attenuation P are specified for a value of absorption coefficient μ of 0.06908 1/μm. As shown in table (a), with a dimming layer 250 comprising such an absorption coefficient μ, the relative attenuation P is adjustable over three decades, from 1:1 to 1:1000 by changing the thickness 251 from 0 μm to 100 μm.

Table (b) specifies the transmittance T and relative attenuation P for a value of absorption coefficient μ of 0.6908 1/μm. As shown in table (b), with a dimming layer 250 comprising such an absorption coefficient μ, the relative attenuation P is adjustable over three decades, from 1:1 to 1:1000 by changing the thickness 251 from 0 μm to 10 μm.

Figure 13:
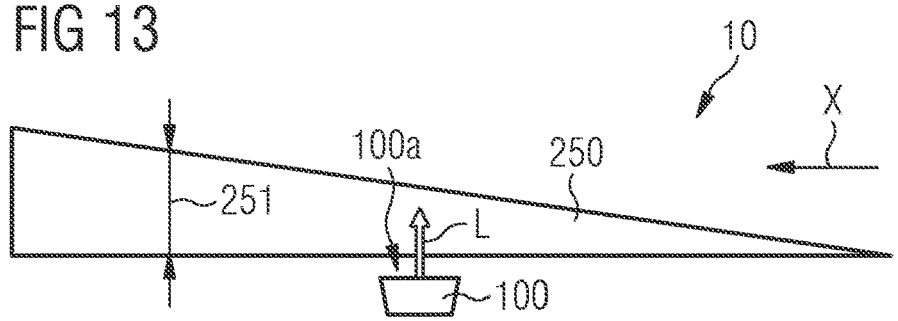

FIG. 13 shows an exemplary embodiment of a light-emitting component 10 with a light source 100 and a dimming element 200 comprising a dimming layer 250. The dimming layer 250 is, for example, a so-called neutral density filter in which light is attenuated as it passes through, regardless of its wavelength. The dimming layer 250 comprises an extension direction X along which the dimming capability of the dimming layer 250 increases. The dimming layer 250 is displaceable along the extension direction X relative to the light source 100, and a degree of absorption and/or reflection of the light emitted from the emitter 101 is variably adjustable by displacing the dimming layer 250 relative to the light source 100 during operation of the component 10.

The dimming capability of the dimming layer 250 along the extension direction X increases due to an increasing thickness 251 of the dimming layer 250.

Alternatively or additionally, the dimming layer 250 may comprise absorber and/or reflector particles whose concentration within the dimming layer 250 increases along the extension direction X of the dimming layer 250. Thus, the dimming capability of the dimming layer additionally varies based on a variation in the concentration of the absorber and/or reflector particles along the extension direction X.

For example, the dimming layer 250 comprises a maximum thickness of 10 μm and comprises a length 252 of 200 μm along the extension direction X. In particular, the emission surface 100a of the light source 100 comprises an edge length of 10 μm along the extension direction. For example, the length 252 of the dimming layer is twenty times larger than the edge length of the emission surface 100a along the extension direction X.

Figure 14:
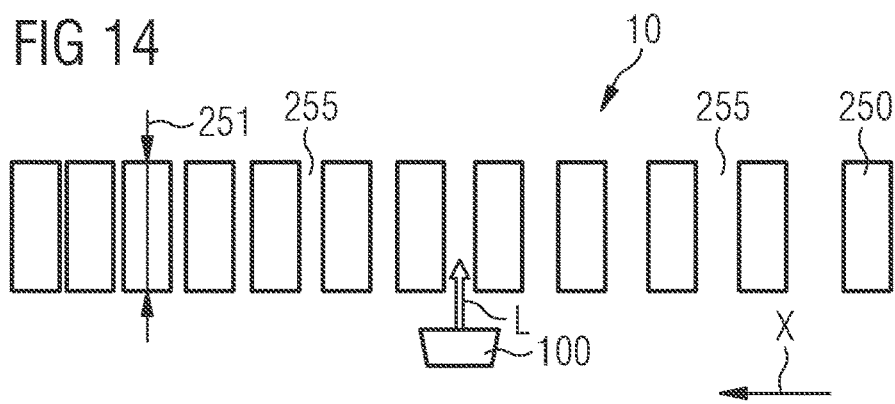

FIG. 14 shows an exemplary embodiment of a light-emitting component 10 in a schematic sectional view. In contrast to the exemplary embodiment shown in FIG. 13, the dimming layer 250 is constant in its thickness 251. The dimming layer 250 comprises cutouts 255, wherein the cutouts 255 completely penetrate the dimming layer 250. The dimming capability increases along the extension direction X due to a decreasing area proportion of the cutouts 255 in the dimming layer 250. Along the extension direction X, the size of the cutouts decreases transversely to the radiation direction Z, which increases the dimming capability of the dimming layer 250 along the extension direction X.

By shifting the dimming layer 250 relative to the light source 100, the portion of the light emitted by the light source 100 that is transmitted through the dimming layer 250 is changed. Thus, by displacing the dimming layer, the brightness of the light L3 emitted by the light-emitting component 10 can be adjusted.

Figure 15:
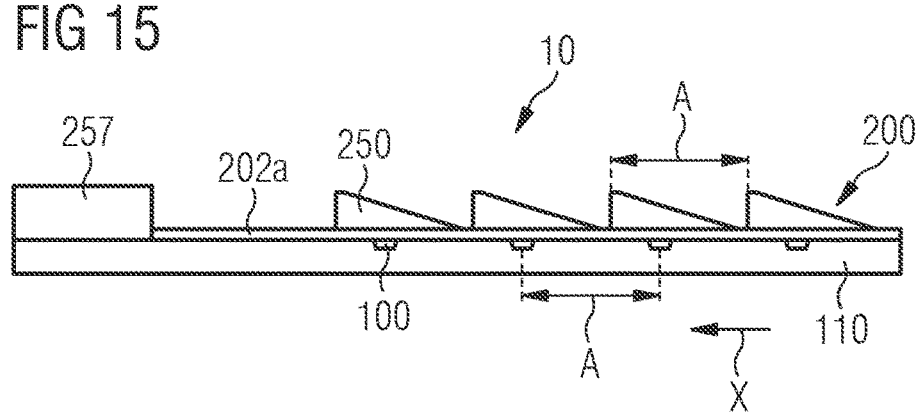
Figure 16:
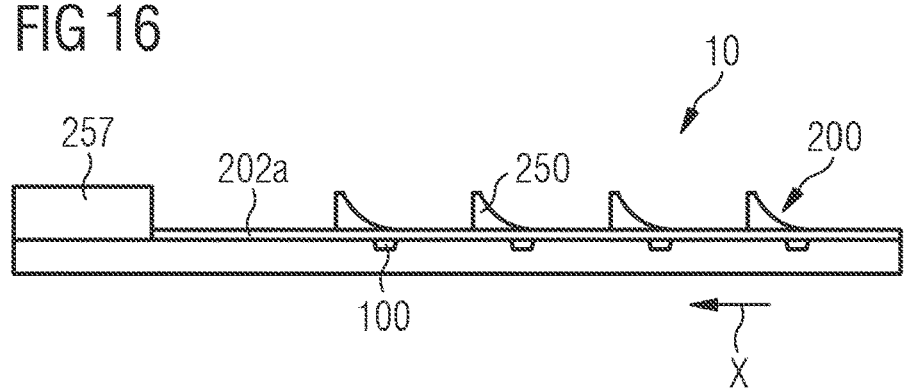

FIG. 15 and FIG. 16 show exemplary embodiments of light-emitting components 10 in schematic sectional views. The light-emitting components 10 comprise light sources 100, each of which is configured to emit light L2 of a predeterminable color location. Each dimming element 200 comprises a dimming layer 250, a first cover layer 202a, and an actuator 257. The actuator 257 is, for example, a piezoelectric element. The first cover layer 202a is a mechanically supporting component of the dimming layer 250. In particular, the dimming layer is formed in a multiple connected or non-connected manner.

By means of the actuator 257, the first cover layer 202a and thus the dimming layer 250 are displaced along the extension direction X, thereby changing the absorption and/or reflection of the light L1 emitted by each emitter of the light source 100.

The dimming capability of the dimming layer 250 varies periodically along the extension direction X of the dimming layer 250, and the periodicity of the variation of the dimming capability of the dimming layer 250 corresponds to distances A between the light sources 100. For example, the distance A between the light sources along the extension direction X is 200 µm.

In the exemplary embodiment shown in FIG. 15, the brightness of the light L3 emitted by the light-emitting component 10 changes linearly with the displacement along the extension direction X when the dimming layer 250 is displaced, since the thickness 251 of the dimming layer 250 varies linearly along the extension direction X.

In the exemplary embodiment shown in FIG. 16, the thickness 251 of the dimming layer 250 varies exponentially. Thus, when the dimming layer 250 is displaced relative to the light sources 100, the brightness varies exponentially with the displacement along the extension direction X.

Figure 17:
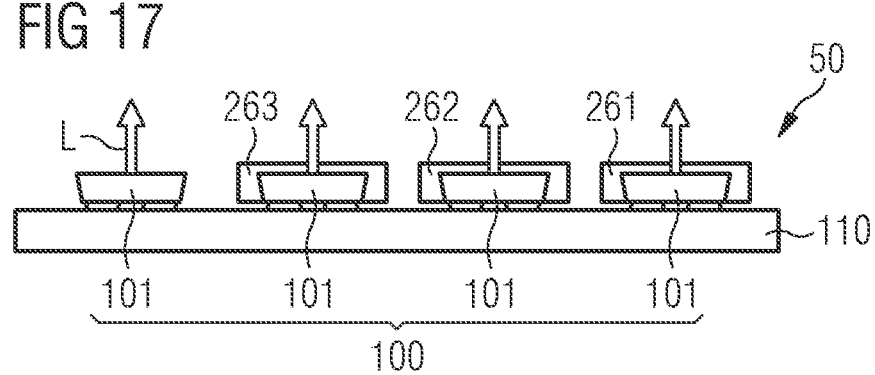
Figure 18:
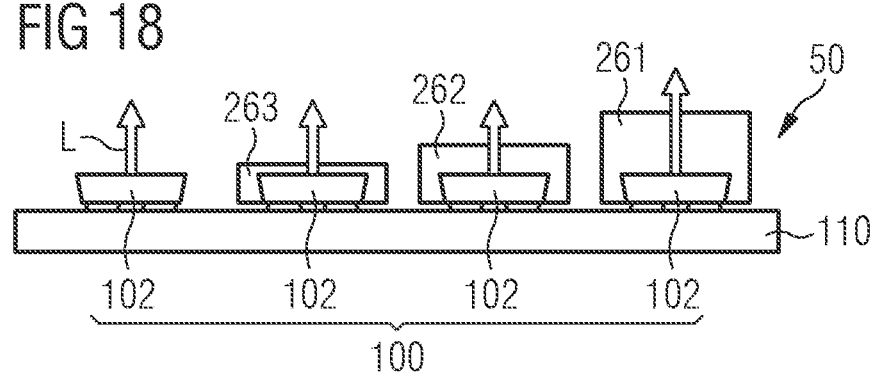
Figure 19:
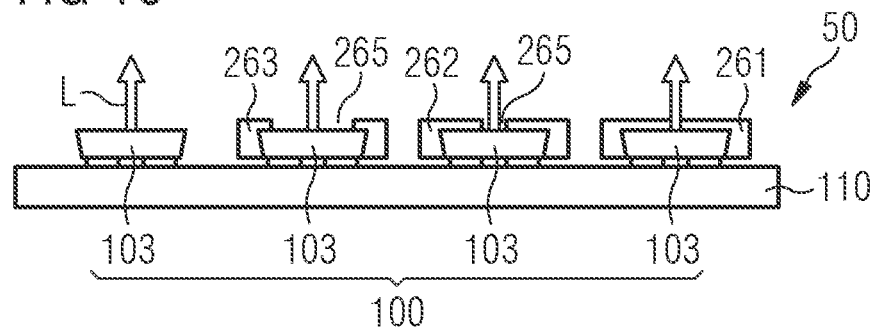

FIGS. 17, 18, and 19 show exemplary embodiments of a light-emitting component 10 in a schematic sectional view. Each light-emitting components 10 comprises four emitters 101, 102, 103 of the same type. The emitters of the same type are configured to emit light L1 of a substantially same color location.

Downstream of the emitters 101, 102, 103 is the dimming element 200, which comprises a plurality of segments 261, 262, 263. The segments 261, 261, 263 are respectively associated with the emitters 101, 102, 103 of the same type. The segments 261, 262, 263 of the dimming element 200 comprise mutually different dimming capabilities for the light L1 emitted by the emitters of the same type. One of the segments 261, 262, 263 is associated with each of the emitters 101, 102, 103.

The segments may each be manufactured in a common manufacturing process together with the emitters 101, 102, 103 to which the segments 261, 262, 263 are assigned.

In the exemplary embodiment shown in FIG. 17, the segments 261, 262, 263 are formed with different materials that comprise different transmittances. For example, the segments comprise a different proportion of an absorbent material. The absorbing material may be, for example, absorber particles and/or reflector particles. Depending on which of the emitters 101, 102, 103 is operated, a different portion of the light L1 emitted by the light source 100 is absorbed and/or reflected by means of the segments. For example, the attenuation P of the emitters 101, 102, 103 differ from another by a factor of 10.

In the exemplary embodiment shown in FIG. 18, the segments 261, 262, 263 comprise a different thickness, so that the light L1, L2 emitted by the emitters 102 travels a different path length within the material of the segment 260. The greater the path length of the light L1, L2 within a segment 261, 262, 263 the greater the proportion of the light L1, L2 which is reflected or absorbed in the segment 261, 262, 263. Depending on which of the emitters 102 is operated, a different portion of the light L2 emitted by the light source 100 is dimmed by means of the segments 261, 262, 263.

In the exemplary embodiment shown in FIG. 19, the segments 261, 262, 263 differ from each other by an aperture 265. In the region of the aperture 265, the emitters 103 are each free of the material of the segments 261, 262, 263, so that the light L1 is not reflected or absorbed by the segments due to the aperture 265. The different size of the aperture, in particular the presence of the aperture 261, dictates the proportion to which light L1 emitted by the emitter 103 is absorbed and/or reflected in each case.

The light source 100 of the light-emitting component 10 may comprise a plurality of emitters of the same type, which comprise a surface of different size through which light L1 is emitted. Thus, the light source 100 is dimmable by means of operating different emitters 101 of the same type.

The invention is not restricted to the exemplary embodiments by the description on the basis of said exemplary embodiments. Rather, the invention encompasses any new feature and also any combination of features, which in particular comprises any combination of features in the patent claims and any combination of features in the exemplary embodiments, even if this feature or this combination itself is not explicitly specified in the patent claims or exemplary embodiments.

REFERENCES 10 light-emitting component
100 light source
100a emission surface
101 emitter of a first type
102 emitter of a second type
103 emitter of a third type
110 carrier
110a main surface
111 transistor
111N n-doped region
111P p-doped region
112 via
113 insulating layer
114 anti-reflection layer
115a first polarization filter
115b second polarization filter
117a first adhesive layer
117b second adhesive layer
117c third adhesive layer
200 dimming element
201a first electrode
201b second electrode
202a first cover layer
202b second cover layer
210 liquid crystal layer
211 metal grid
220 electrochromic layer
230 suspension
231 absorber and/or reflector particles
240 liquid chamber
241 absorbent liquid
242 flexible membrane
245 section
246 channel
247 pump
249 spacer
250 dimming layer
251 thickness of the dimming layer
252 length of the dimming layer
255 cutout
257 actuator 261, 262, 263 segment of the dimming element
265 aperture
300 cover glass
A distance
D drain
G gate
H height
L1 light emitted by emitters
L2 light emitted by light sources
L3 light emitted by the light-emitting component
M magnetic field
P attenuation
P1 pressure
S source
T transmission
U voltage
V volume
UG ambient volume
X extension direction

The invention claimed is:

1. A light-emitting component with a light source and a dimming element arranged downstream of the light source in a radiation direction, wherein
the dimming element comprises a dimming layer,
the light source comprises at least one emitter, which is configured to emit light,
a brightness of a light emitted by the light-emitting component is adjustable, wherein
the brightness is partially adjustable by means of a pulse width modulated and/or amplitude modulated operating signal for the emitter, and
the brightness is partially adjustable by means of partial absorption and/or reflection of the light emitted by the emitter in the dimming element,
a dimming capability of the dimming layer increases along an extension direction transverse to the radiation direction,
the dimming layer is displaceable along the extension direction relative to the light source,
a degree of absorption and/or reflection of light emitted by the emitter is variably adjustable by means of displacement of the dimming layer relative to the light source during operation of the component,
the dimming capability of the dimming layer increases along the extension direction due to an increasing thickness of the dimming layer, and
the light-emitting component is configured to emit light which comprises a color depth of at least 18 bits, wherein
at least 6 bits of the color depth are adjustable by means of the dimming element arranged downstream of the light source in the radiation direction, and
a remaining portion of the color depth is adjustable by means of the pulse-width-modulated and/or amplitude-modulated operating signal of the emitter.

2. The light-emitting component according to claim 1, wherein
the light source comprises at least one emitter of a first type, at least one emitter of a second type and at least one emitter of a third type, which are configured to emit light of different color locations, and
the dimming element is a common dimming element that is arranged downstream of each of the emitters in the radiation direction.

3. The light-emitting component according to claim 1, in which the dimming layer comprises cutouts, wherein
the cutouts penetrate the dimming layer completely, and the dimming capability increases due to a decreasing area fraction of the cutouts.

4. The light-emitting component according to claim 1, comprising at least two emitters of the same type configured to emit light of a substantially same color location, wherein
the dimming element comprises a plurality of segments, wherein
each of the at least two emitters is associated with one of the segments, and
the segments comprise mutually different dimming capabilities for the light emitted by the emitters.

5. The light-emitting component according to claim 1, which is an image display device, wherein
the light-emitting component comprises a plurality of light sources,
the light sources are arranged side by side on a main surface, and
the color location of light emitted by each light source is individually adjustable.

6. The light-emitting component according to claim 5, wherein the dimming element is a common dimming element that is arranged downstream of each of the plurality of light sources, and
the common dimming element reflects and/or absorbs substantially an equal proportion of the emitted light of all of the light sources.

7. The light-emitting component according to claim 6, wherein
the dimming capability of the dimming layer varies periodically along the extension direction of the dimming layer, and
the periodicity of the variation of the dimming capability of the dimming layer corresponds to distances of the light sources from each other.

8. A method of operating a light-emitting component according to claim 1, wherein
the light source is operated at a repetition rate of at least 60 Hz, and
the light emitted by the light-emitting component comprises a color depth of at least 18 bits, wherein
at least 6 bits of the color depth are adjusted by means of absorption and/or reflection of the light emitted from the emitter at the dimming element, and
a remaining portion of the color depth is adjusted by means of the pulse width modulated and/or amplitude modulated operating signal of the emitter.

9. A light-emitting component with a light source and a dimming element arranged downstream of the light source in a radiation direction, wherein
the light source comprises at least one emitter, which is configured to emit light,
a brightness of a light emitted by the light-emitting component is adjustable, wherein
the brightness is partially adjustable by means of a pulse width modulated and/or amplitude modulated operating signal for the emitter, and
the brightness is partially adjustable by means of partial absorption and/or reflection of the light emitted by the emitter in the dimming element, and
the light-emitting component is configured to emit light which comprises a color depth of at least 18 bits, wherein
at least 6 bits of the color depth are adjustable by means of the dimming element arranged downstream of the light source in the radiation direction, and a remaining portion of the color depth is adjustable by means of the pulse-width-modulated and/or amplitude-modulated operating signal of the emitter.

10. The light-emitting component according to claim 9, wherein
the light source comprises at least one emitter of a first type, at least one emitter of a second type and at least one emitter of a third type, which are configured to emit light of different color locations, and
the dimming element is a common dimming element that is arranged downstream of each of the emitters in the radiation direction.

11. The light-emitting component according to claim 9, wherein
the dimming element comprises a liquid crystal layer whose dimming capability is variably adjustable in particular by applying different electrical voltages during operation of the component.

12. The light-emitting component according to claim 9, in which the dimming element comprises an electrochromic layer whose dimming capability is adjustable by applying different electrical voltages during operation of the component.

13. The light-emitting component according to claim 9, wherein the dimming element comprises absorber and/or reflector particles in a suspension, wherein a dimming capability of the suspension is variably adjustable by applying an electric or magnetic field during operation of the component.

14. The light-emitting component according to claim 9, wherein the dimming element comprises at least one liquid chamber,
a volume of the liquid chamber is variable,
the liquid chamber is filled with a reflective or absorbent liquid, and
a dimming capability of the dimming element is variably adjustable by changing the volume of the liquid chamber during operation of the component.

15. The light-emitting component according to claim 9, comprising at least two emitters of the same type configured to emit light of a substantially same color location, wherein
the dimming element comprises a plurality of segments, wherein
each of the at least two emitters is associated with one of the segments, and
the segments comprise mutually different dimming capabilities for the light emitted by the emitters.

16. The light-emitting component according claim 9, which is an image display device, wherein
the light-emitting component comprises a plurality of light sources,
the light sources are arranged side by side on a main surface, and
the color location of light emitted by each light source is individually adjustable.

17. The light-emitting component according to claim 16, wherein the dimming element is a common dimming element that is arranged downstream of each of the plurality of light sources, and
the common dimming element reflects and/or absorbs substantially an equal proportion of the emitted light of all of the light sources.

* * * * *